(12) United States Patent
Pham

(10) Patent No.: US 7,584,137 B2
(45) Date of Patent: Sep. 1, 2009

(54) FINANCIAL EXCHANGE SYSTEM AND METHOD

(76) Inventor: Nam D Pham, 110 Rose Garden Way, Frederick, MD (US) 21702

(*) Notice: Subject to any disclaimer, the term of this patent is extended or adjusted under 35 U.S.C. 154(b) by 1288 days.

(21) Appl. No.: 10/027,903

(22) Filed: Dec. 20, 2001

(65) Prior Publication Data

US 2003/0149652 A1    Aug. 7, 2003

(51) Int. Cl.
*G06Q 40/00* (2006.01)
(52) U.S. Cl. .......................................... 705/37; 705/35
(58) Field of Classification Search .............. 705/35–37
See application file for complete search history.

(56) References Cited

U.S. PATENT DOCUMENTS

| 4,903,201 A | 2/1990 | Wagner |
| 5,749,785 A * | 5/1998 | Rossides ...................... 463/25 |
| 5,794,207 A | 8/1998 | Walker et al. |
| 5,806,048 A | 9/1998 | Kiron et al. |
| 5,845,266 A | 12/1998 | Lupien et al. |
| 5,873,782 A | 2/1999 | Hall |
| 6,321,212 B1 * | 11/2001 | Lange ...................... 705/36 R |

* cited by examiner

*Primary Examiner*—Thu Thao Havan
(74) *Attorney, Agent, or Firm*—IPxLaw Group LLP

(57) ABSTRACT

A system and method for administering an investment contract between at least two investors. Initially, the investment contract is associated with a first investor. The contract is based on at least one underlying commodity, however, the first investor does not hold the underlying commodity or agree to buy or sell the underlying commodity. The system matches the contract with a second investor thereby creating an active contract. The second investor does not hold the underlying commodity or agree to buy or sell the underlying commodity. The system temporarily holds the first and second investor funds associated with the contract, and pays off one of the first and second investor upon expiration of the contract. Contract expiration is based on either a deviation from a target price or a time horizon.

40 Claims, 9 Drawing Sheets

FINANCIAL EXCHANGE SYSTEM AND METHOD

The present invention relates generally to the field of financial exchange systems and methods, and in particular, relates to a financial exchange system and method that allows individuals to interact directly with each other to take a position on an underlying commodity's price movements without holding the underlying commodity.

The invention breaks down barriers found in traditional futures and option markets to open investment opportunities in commodities to every investor. Utilizing a more favorable regulatory environment and Internet technology, the invention encompasses an improved financial exchange (the "Exchange"). The Exchange, an electronic marketplace, allows individuals to interact directly with each other to take a position on an underlying commodity's price movements without holding the underlying commodity. The Exchange does not act as a broker-dealer, investment advisor or market-maker. Any individual can enter the Exchange to hedge or speculate on the price movements of offered commodities. There are no intermediaries and no membership or financial requirements. The value of a typical contract is likely to range between $100 and $1,000.

The invention encompasses at least a set of five alternative contracts for investors to capture the potential return from the price movement of an underlying commodity without holding the underlying commodity. Contracts are made between two individuals who have different expectations of a commodity's price movements during a defined time period. The most basic contract allows investors to negotiate a fixed lump-sum payoff based on the simple directional price movement of a commodity from an agreed starting point. Other contracts cater to those investors wishing to structure more sophisticated risk-return tradeoffs and hedging strategies. Unlike traditional futures and options contracts, the invention encompasses contracts structured by choosing four elements—target price, price range, time horizon and payoff amount. The multidimensional nature of these contracts allows each investor to tailor his or her contract to meet his or her specific investment goals.

Investors preferably access the Exchange via an Internet Wold Wide Web (WWW) page or website. Investors typically search for investment opportunities, either by initiating contracts or by responding to contracts. When an investor initiates a contract, the Exchange searches its database to find a counterparty. If there is no exact match, the contract will be posted on the Exchange for other investors to respond. Alternatively, an investor can access the Exchange to respond directly to a contract that was initiated by another investor. After a contract is agreed upon, the Exchange monitors the contract and ensures that payment is made properly. An independent custodial bank preferably holds the expected payoff posted by each contracting party until the contract expires. At that point, the actual payoff is calculated and placed in the appropriate investor's accounts. All transactions are preferably cash-settled on the basis of specified market closing prices.

Several key elements distinguish the Exchange from known business models:

Investors are able to transact in an array of global commodities without holding the underlying commodity. Thus, there are no constraints with respect to a commodity's lot size, other standardized parameters or the investor's annual income and net worth;

Investors can access the Exchange marketplace with a smaller amount of capital than in traditional markets; there are no membership or financial requirements;

Investors can control market risks by structuring payoffs based on the individual's risk tolerance; an investor's potential losses are constrained by the contract structure and terms elected;

Investors become price makers and do not take positions against the Exchange or any financial institution; and, Investing with the Exchange is efficient and cost-effective; there are no intermediaries and middle men costs.

SUMMARY OF THE INVENTION

The invention is directed to a system and method of administering an investment contract between at least two investors. A contract is associated with a first investor, wherein the contract is based on at least one underlying commodity and wherein the first investor does not hold the underlying commodity or agree to buy or sell the underlying commodity. The contract is matched with a second investor thereby creating an active contract, wherein the second investor does not hold the underlying commodity or agree to buy or sell the underlying commodity. First and second investor funds associated with the contract are at least temporarily held. The market value of the underlying commodity upon expiration of the contract in relation to one of a target price and a target price range provide a basis to determine which one of the first and second investor is to receive a payoff. Either the first or second is paid off upon expiration of the contract, wherein expiration of the contract is based on at least one of a deviation from a target price range and a specified maturity date.

In a preferred aspect of the invention, a price movement having a direction is defined by comparing the target price to the market value of the underlying commodity upon expiration of the contract, wherein the contract specifies an expiration date, a first and second expected direction associated with the first and second investor and a fixed lump-sum payoff, and wherein the payoff is selectively transferred to one of the first and second investor upon expiration of the contract based on the direction of the price movement of the commodity in relation to the first and second expected direction.

In another preferred aspect of the invention a price movement having a number of ticks and direction is defined by comparing the target price to the market value of the underlying commodity upon expiration of the contract, wherein the contract specifies an expiration time, a first and second expected direction associated with the first and second investor and dollars per tick, and wherein the payoff is calculated and transferred to one of the first and second investor upon expiration of the contract based on the direction of the price movement, the number of ticks and the dollars per tick.

In another preferred aspect of the invention the contract further specifies a cap, and wherein the payoff transferred to one of the first and second investor is limited by the cap.

In another preferred aspect of the invention, the commodity has a market value at expiration of the contract, and wherein the contract specifies an expiration date, a first target price range associated with the first investor, a second target price range associated with the second investor and a fixed lump-sum payoff, and wherein the fixed lump-sum payoff is transferred to one of the first and second investor upon expiration of the contract based on the market value of the commodity upon expiration of the contract in relation to the first and second price ranges.

In another preferred aspect of the invention, the fixed lump-sum payoff is transferred to the first investor if the market value of the commodity upon expiration of the contract falls within the first target price range.

In another preferred aspect of the invention, the fixed lump-sum payoff is transferred to the second investor if the market value of the commodity upon expiration of the contract falls within the second target price range.

In another preferred aspect of the invention, the commodity has a market value upon expiration of the contract, wherein the contract specifies an expiration date, a price range bounded by an upper cap associated with the first investor and a lower cap associated with the second investor and fixed lump-sum payoff, and wherein the fixed lump-sum payoff is transferred to one of the first and second investor based on one of the market value of the commodity upon expiration of the contract in relation to the price range.

In another preferred aspect of the invention, the fixed lump-sum payoff is transferred to the first investor if the market value of the commodity reaches the upper cap prior to the expiration date.

In another preferred aspect of the invention, the fixed lump-sum payoff is transferred to the second investor if the market value of the commodity reaches one of the lower cap prior to the expiration date.

In another preferred aspect of the invention, the fixed lump-sum payoff is transferred to the first investor on the expiration date if the market value of the commodity on the expiration date falls within a portion of the price range associated with the first investor.

In another preferred aspect of the invention, the fixed lump-sum payoff is transferred to the second investor on the expiration date if the market value of the commodity on the expiration date falls within a portion of the price range associated with the second investor.

In another preferred aspect of the invention, the commodity has a market value at expiration of the contract, and wherein the contract specifies an expiration date, a price range bounded by an upper cap associated with the first investor and a lower cap associated with the second investor, a target price and dollars-per-tick, and wherein a payoff is calculated and transferred to one of the first and second investor upon expiration of the contract based on the market value of the commodity upon expiration of the contract in relation to the price range.

In another preferred aspect of the invention, the payoff transferred to one of the first and second investor is limited by one of the first and second cap.

In another preferred aspect of the invention, the payoff is transferred to the first investor if the market value of the commodity reaches the first cap prior to the expiration date.

In another preferred aspect of the invention, the payoff is transferred to the second investor if the market value of the commodity reaches the second cap prior to the expiration date.

In another preferred aspect of the invention, the payoff is transferred to the first investor on the expiration date if the market value of the commodity on the expiration date falls within a price range associated with the first investor.

In another preferred aspect of the invention, the payoff is calculated based on the difference between the market value of the commodity upon expiration of the contract and the target price multiplied by the dollars-per-tick.

In another preferred aspect of the invention, the payoff is transferred to the second investor on the expiration date if the market value of the commodity on the expiration date falls within a price range associated with the second investor.

In another preferred aspect of the invention, the payoff is calculated based on the difference between the market value of the commodity upon expiration of the contract and the target price multiplied by the dollars-per-tick.

DETAILED DESCRIPTION OF THE INVENTION

Figure 1:
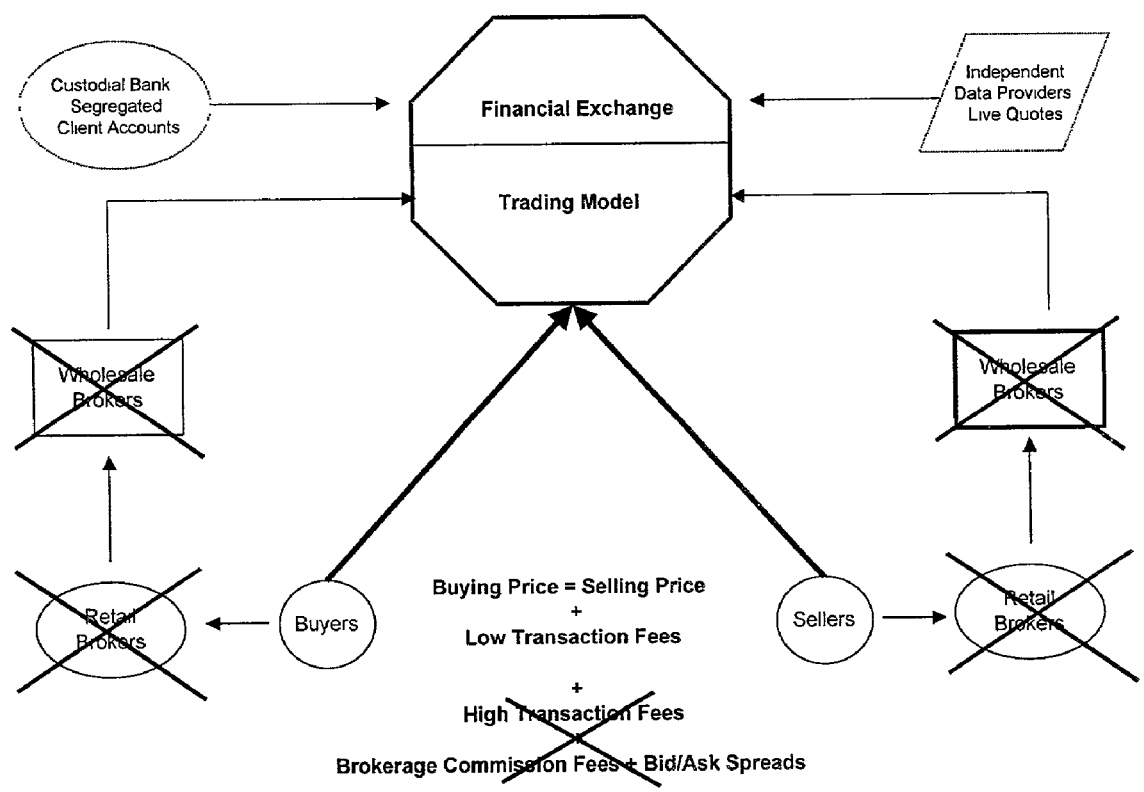
FIG. 1 shows a graphical representation of an exchange in accordance with the invention.

The following terms shall have, for the purposes of this application, the respective meanings set forth below.

Contract—generally refers to an agreement that two investors enter upon defining a specific investment opportunity. In the context of the invention, each contract preferably has at least four elements: target price, range, time and payoff amount. Investors set these four elements based on their own preferences. A contract is structured between two investors with different price expectations. The Exchange matches investors to structure contracts, monitors contracts until expiration times and ensures payoffs are made properly among investors. An "active" contract has two investors who have opposite positions and cannot be cancelled. A "closed" contract refers to a contract that expired and payoffs have been made to the proper party.

Commodity—generally refers to all goods and interests including but, not limited to: (a) a debt security; (b) an equity security; (c) an insurance policy; (d) an interest in a partnership, a trust or the estate of a deceased individual, or any right in respect of such an interest; (e) a precious metal; (f) an option or a contract for the future supply of a commodity; (g) a prescribed instrument; (h) a guarantee, an acceptance or an indemnity; (i) an option or a contract for the future supply of money or the like; (j) economic indicators an indexes; (k) heating and cooling days and the like; (l) a national currency; (m) a natural resources (e.g., crude oil); (n) utilities (e.g., gasoline, running water, electricity).

Database—generally refers to a collection of information stored for later retrieval. Traditional databases are organized by fields, records, and files. A field is a single piece of information; a record is one complete set of fields; and a file is a collection of records. The term "database" is used herein in its broadest sense (i.e., a collection of information) and is not limited to any particular structure or implementation.

Data network—generally refers to a group of two or more computer systems linked together in data communication. The term "data network" encompasses any type of wired or wireless computer network, independent of protocol, including local-area networks (LANs), wide-area networks (WANs) and networks of networks including the intranet, extranet and the Internet.

Directional Move—generally refers to the direction of the price that investors expect a commodity to move.

Dollars-per-Tick Payoff—generally refers to the calculation of payoffs at contract expiration based on a pre-selected value (Dollars-per-Tick) multiplied by the number of ticks that the commodity's value at expiration of the contract (market value) deviates from the target price.

Expiration Date—generally refers to the specific termination date of a contract that has not otherwise terminated for other reasons (such as a payoff due to a cap or limit).

Expiration Time—generally refers to the maturity date of a contract. Investors can structure a contract with a fixed-time or a flexible-time option.

Fixed-Time—generally refers to the time that is set by two investors to terminate a contract. A fixed-time contract cannot be terminated before the pre-determined date.

Fixed Lump-Sum Payoff—generally refers to the total amount of potential gains or losses regardless of the magnitude of the price movements. Investors determine the fixed lump-sum payoff upon structuring a contract. At contract expiration time, the fixed lump-sum payoff will be paid to the investor who makes the correct forecast on the price movement of the underlying commodity.

Flexible-Time—generally refers to a span of time in which a contract remains active, where the contracts outcome depends upon a particular price being hit.

Limit (cap)—generally refers to a price level of an underlying commodity that determines the maximum deviation from the target price that can occur under a contract. Investors control their investment risks by adjusting the limit.

Posting—generally refers to a potential contract (offer) that an individual places on the Exchange for the purpose of soliciting other investors who have different price expectations. A posting normally includes a target price, price limit, expiration time and payoffs.

Range/Deviations from Target price—generally refers to a price range that an individual expects a commodity—s price will be within in the future. The price range is bounded by a target price and a limit. The price range can be limited by a certain price or can be open.

Range Move—A price band within which investors expect the value of a commodity to move in the future.

Relational Database—A database generally built on a relationship model in which data is organized in tables. The set of names of the table columns is called the "schema" of the table. Data can be manipulated using a relational algebra. SQL is a standard language for communicating with and/or querying a database built on the relational model.

Server—generally refers to a program running on a computer that provides some service to other (e.g., client) programs. The connection between client and server is normally by means of message passing, often over a network, and uses some protocol to encode the client's requests and the server's responses.

SSL—Secure Sockets Layer, a protocol developed for transmitting private documents via the Internet. SSL works by using a public key to encrypt data that is transferred over the SSL connection.

Target Price—generally refers to a price that is determined based on individuals' expectations of the price movement of a commodity in the future and is used for calculating payoffs.

FIG. 1 shows a graphical representation of an exchange in accordance with the invention. The Exchange allows sellers and buyers to structure contracts to hedge and speculate on price movements of various commodities. The Exchange uses trading algorithms to match individuals to structure contracts. An independent bank is preferably the custodial for Exchange user accounts. The custodial bank preferably holds unused balances. When users initiate or respond to contracts, the Exchange temporarily withholds or causes the custodial bank to temporarily withhold the appropriate finds until contracts expire. The Exchange preferably uses external data providers to supply various information, such as market quotes to monitor underlying commodity values or prices. The Exchange enforces the contract until its expiration time and transfers or causes the custodial bank to transfer the withholding funds to the appropriate accounts.

The Exchange eliminates intermediaries in traditional exchanges to reduce the price differences between buyers and sellers. Buyers and sellers need not pay commissions to brokers, transaction fees to brokerage firms and bid/ask spreads. Exchange users preferably pay only a small fee when contracts are structured.

The invention encompasses at least a set of five alternative contracts that differ from traditional futures and option contracts to introduce alternative investment vehicles for retail investors such as non-institutional and non-accredited individuals. Potential contributions of the Exchange to the investment community and daily activities include: improving market efficiencies, increasing personal diversification and reducing individuals' risks for both personal and commercial daily activities. The Exchange reduces the market disadvantages experienced by non-institutional investors and opens a new investment horizon to both full- and part-time investors. The market risks associated with such activity can be controlled to varying degrees with these unique contracts. Preferably, the Exchange derives revenue from user (investor) transaction fees.

Users preferably access the Exchange via an Internet website. Accordingly, a typical Exchange user will access the Internet using a "user network processing device." The user is then presented with a one or more web pages designed to facilitate the posting of contracts, responding to previously posted contracts and the like. Thus, the users and the Exchange are preferably coupled in data communication. The term "coupled" as recited herein is used in its broadest sense and does not require a physical connection between devices. Two or more devices as disclosed herein are "coupled" so long as data communication between the devices is possible (e.g., hard wired data communication, wireless data communications and the like).

The term "user network processing device" generally refers to any user operable device having access to a data network (such as the Internet) including but not limited to a personal computer (portable or desktop), personal digital assistant (PDA), Browser phone, 2-way pager or the like. The user network processing device can be operated by an individual or may be programmed to operate automatically (i.e., timed schedule or triggered by an external event). Thus, the term "user" as recited herein encompasses an individual as well as a computerized device operable to access the data network and perform computer automated functions.

The terms "present" or "presenting" as used herein are used in their ordinary sense and include displaying or playing audio and/or visual information to a user. Communication between the user and the computer system is preferably carried out via a data network such as the Internet. The data network generally includes a plurality of nodes such as a user network processing device or user (i.e., a PC and Web Browser), the computer system (e.g., including a server and the associated hardware and software) and one or more databases coupled in data communication.

Figure 2:
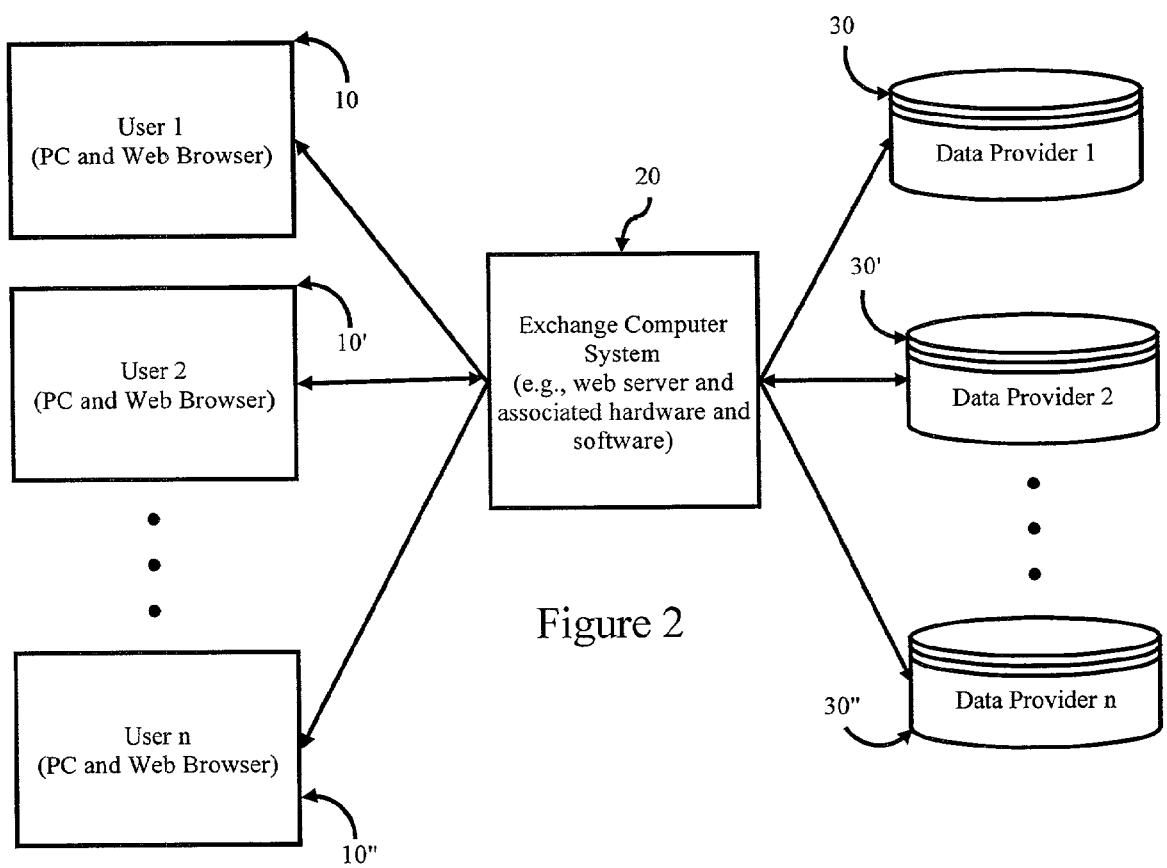
FIG. 2 graphically shows a plurality of user network processing devices, the Exchange computer system and Data Providers in accordance with the invention.

FIG. 2 shows a general block diagram of a plurality of user network processing devices (user PC and Web Browsers 10, 10', 10"), the Exchange computer system 20, and data providers (e.g., custodial banks, financial data providers and the like 30, 30', 30") in accordance with the invention. It is understood that a virtually unlimited number of users and data providers can be associated with the computer system. In this regard, FIG. 2 shows User n, 10" and Data Provider n, 30" (where n can be any positive number).

FIG. 2 generally shows the data communications paths between the user PC and Web Browser 10, computer system 20 and database 30. It is understood that data communications via the Internet often traverse a series of intermediate network nodes prior to reaching the desired destination (e.g., the user PC and Web Browser or the content provider website). The arrows shown in FIG. 1 do not suggest a direct physical connection between the users, computer system and databases and encompass typical network and/or Internet communications (a connectionless, best-efforts packet-based system). It is also understood that other data networks using various network protocols are suitable for use in accordance with the invention. For matters of simplicity, the data provides shown in FIG. 2 are shown external to the computer system. It is understood that other data sources or databases can be incorporated internally or locally within the Exchange computer system.

The user PC and Web Browser 10 is operable to access the Internet World Wide Web (WWW or Web). The user PC preferably has an associated operating system such as Microsoft Windows or Linux and includes a typical Web Browser such as Netscape Communicator or Microsoft Internet Explorer, or another web browser product. The Web Browser assists the user in requesting and displaying Web pages or sites containing desired information. The hardware and software configuration of a user network processing device for Internet access is routine and generally known to those skilled in the art.

The computer system 20 preferably includes one or more HTTP server hosting a website. There are many varieties of commercially or publicly available World Wide Web server software packages which are compatible with the invention (e.g., Apache, IBM WebSphere products, NETSCAPE Enterprise, Microsoft Windows 2000 Server and the like) all of which can be implemented with commonly available hardware from vendors such as IBM, Hewlett Packard, Compaq, Dell, Sun Microsystems and numerous others that are known to those skilled in the art.

For example, the invention can be implemented using Sun Microsystems Enterprise servers, running the Sun Solaris operating system. The server preferably has secure hard disk storage (e.g., a RAID-5 hard disk array) to protect against any possible disk failures and/or data loss. Database software and management storage can be implemented using Oracle 8i Standard Edition Database software. Allaire Cold Fusion can be used as the application server for coding the logic for the Exchange website. Apache web server can also be used (e.g., on Unix based machines). The Exchange is preferably implemented using SSL to provide maximum user security. Servers are preferably located at a major Internet Service Provider (ISP) thereby providing access to redundant power supplies, networking, 100 percent uptime guarantees for both the networking and power, easy access to Internet's backbone providing fast data communication and the like. The hardware and software configuration of the invention based on the disclosure provided herein is well within the grasp of those skilled in the art.

Exchange Investors (Users)

The Exchange is specifically directed to a large market segment of investors, including financially savvy individuals as well as novice investors. The profile of a core client is an active investor either employed in the financial industry or actively engaged in managing his/her financial assets. Secondary clients are people who currently cannot participate in global capital markets because of traditional market rules or capital constraints, but would like to participate in financial markets in order to earn extra money (e.g., for recreational purposes). The size of a typical contract and typical account assets are preferably substantially less than the minimum requirements in traditional futures and options markets. For example, the size of a contract is preferably between $100 and $1,000, as opposed to a typical contract in futures and option markets (e.g., $500,000). Assets in each account are preferably in the range of $1,000 to $10,000, compared with $300,000 in full-service brokerage accounts and $50,000 in online brokerage accounts.

Exchange Provided Services

The Exchange preferably provides an Internet-based exchange. This structure allows investors to be creative, efficient and flexible in their investments without using intermediaries such as brokers and floor specialists. Investors can interact directly with others in hedging against and speculating on the price movements of products or commodities. Individual investors can contract directly with each other rather than though professional market makers or other intermediaries. Investors do not have to buy and hold the underlying commodity as part of their contracts and there are no physical deliveries at the termination of the contract. Investors can determine the size of the payoff at the beginning of a contract to avoid the uncontrollable, and often, unaffordable market risks inherent in traditional futures transactions. Contracts will be fully paid for at inception and funds maintained at federally supervised custodial banks. Preferably, no margining is permitted. Therefore, contracts will entail no default risk.

The Exchange preferably uses market recognized data providers to provide live financial quotes and to calculate payoffs. A federally regulated custodial bank preferably maintains individual accounts. Resources available to the public via the Exchange can include financial news, market information and real-time quotes for currencies, stocks, bonds and commodities.

Several key elements distinguish the Exchange from known business models:

Efficient Process/Do-It-Yourself—Investing with the Exchange is efficient and cost-effective. The Exchange eliminates steps that investors would normally have to encounter in traditional exchanges. Individual investors become their own brokers and the Exchange functions as a marketplace. All middlemen are removed and, therefore, administrative-related costs are significantly decreased. Using the Exchange, investors are able to simplify the complexity of financial markets to the expertise level of each individual. Investors independently interact with the Exchange's Internet-based system, which enables them to locate directly counterparties to structure their contracts.

Market Maker/Level Playing Field—Investors become price makers using the Exchange. Investors using the Exchange can specify any price for specific financial products, contracting with counter parties who have differing views on likely price movements. In addition, non-institutional investors using the Exchange are not subject to the competing interests of investment institutions. Investors using the Exchange take their positions against other private investors.

Wider Set of Commodities—Investors are able to invest in a larger set of commodities in the global capital markets, unlimited by traditional market restrictions (available contract, standardized terms, fixed lot size) and capital constraints (annual income and net worth). In existing financial markets, investors have difficulties in liquidating their positions in highly illiquid securities and pay high bid/ask spreads. Payoffs in accordance with the invention are determined by the price movements of underlying commodities. There is no buying or selling of commodities or products, holdings or rollovers, therefore, investors do not have to incur substantial losses to cover their long or short positions in such commodities.

Controllable Risks/Potential High Returns—The Exchange allows investors to control risks by choosing one of five alternative contracts, each based on the individual's risk tolerance. Investors can set the maximum potential loss to avoid the markets' uncontrollable risks. Spreads are eliminated and transaction fees are kept to a minimum. In traditional options and futures markets, investors face unpredictable and uncontrollable risks.

Low Capital Requirements and Inexpensive—Investors can enter the investment world with minimum capital. The Exchange focuses primarily on investors with modest capital and investors who want to invest in illiquid securities without taking uncontrollable and indefinite risks. Transaction fees are kept to a minimum and there are no other trading costs. Since contracts entail no default risk, the Exchange preferably does not require a minimum capital or net worth.

Roles of the Exchange

MarketPlace—The Exchange preferably facilitates 24-hour-a-day and seven-day-a-week online access for investors to seek investment opportunities. Although contracts are settled based on recognized market prices during regular market hours, investment contracts can be structured between Exchange users at anytime. Without involving brokers and floor specialists, investors structure contracts either by initiating or responding to postings of other investors. In addition, investors can enter the Exchange website to measure market sentiment, obtain research, monitor real-time financial quotes and read financial news. The Exchange can also provide an educational area for individuals to structure contracts without using real money.

Match-Maker—The Exchange, with its selection criteria, electronically matches buyers and sellers. When a user initiates a posting on its web-based market place, the Exchange searches its database to find an exact match. If there is no exact match, the Exchange provides a list of potential counterparties and stores the posting in the database. All contract positions will be posted on the Exchange website on a real-time basis and accessible to all users. The Exchange rules preferably mandate transparency in all transactions and adherence to standards of fair dealing. All information is preferably displayed openly for investors to examine investment opportunities.

Contract Enforcer/Collecting Agent—The Exchange preferably monitors and enforces user's contracts and an independent custodial bank is assigned to maintain user's accounts. When a contract is structured, the custodial bank freezes the expected payoff in both user's accounts. At expiration, the Exchange calculates payoffs and instructs the custodial bank to re-allocate the appropriate funds to the accounts. All contracts are subject to Exchange rules and oversight as well as all applicable regulations. Outsourced independent firms will work in conjunction with internal staffs on regulatory services such as compliance, arbitration, dispute resolution, account registration, market and trade surveillance.

Operation of the Exchange

Access—The Exchange preferably offers its services to all investors (i.e., the Exchange website is preferably open to the public for access to rules, regulations and contract templates). Individuals preferably have free unlimited access to the Exchange to seek investment opportunities, live quotes and financial news. Investors independently place their postings on the Exchange to seek counterparties. Postings will either be responded to by other individuals or from offers in the Exchange's database. Other investors can counteroffer in response to posted offers. Once a contract is agreed upon by two investors, the Exchange monitors the contract and enforces investment payoffs. Preferably, there is no cost to place or to cancel contracts. The Exchange preferably derives revenue from a transaction fee, paid by the investors when contracts are structured.

Investors (users) are preferably required to sign-up or register before using the Exchange website (e.g., select a user name and password). Users may also be charged a membership fee (e.g., a one-time fee, periodic fee, transaction-based fee or the like). The creation and administration of user profiles is well known in the art and need not be disclosed further. The system may provide for on-line electronic payments (e.g., credit card, debit card or the like) as is also well known in the art. It is also understood that web pages requiring private information such as payment and billing information can be provided with enhanced security such as SSL, a secure server or the like.

Investment Payoff—All contracts are preferably based upon openly traded commodities. Prices of the underlying commodities are preferably quoted from recognized data providers. Since Exchange contracts focus exclusively on the price movement of a specific commodity, individual investors determine the payoff based on their level of risk tolerance. Investors choose the payoff system and the ways in which a contract can be extended. Payoffs can be a lump-sum or the difference of their preset target price and actual market price at the expiration of the specific contract.

Accounts—Preferably, each member establishes an account with the Exchange as part of the registration process. Preferably there is no minimum account balance required. However, the account balance will be used to determine the maximum expected payoff that users can establish in structuring their contracts. Preferably, margins and/or negative balance are not allowed. Deposits can be made by a variety of means including, but not limited to, certified checks, electronic deposits or major credit cards and are preferably required before a given contract is structured. Accordingly, payoffs are preferably deposited/withdrawn directly from investors' accounts. An independent federally supervised custodial bank preferably handles user accounts.

Basic Trading Model

Figure 3:
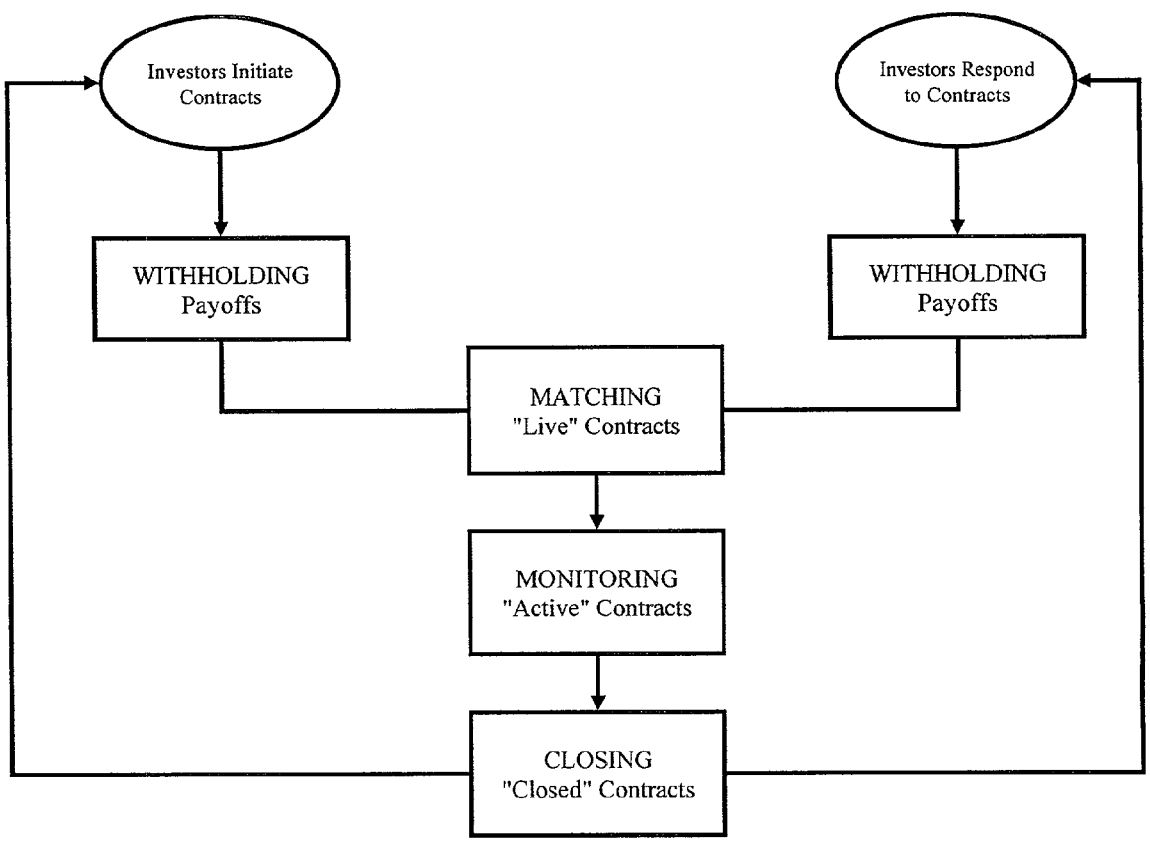
FIG. 3 graphically shows a basic trading model in accordance with the invention.

FIG. 3 graphically shows a basic trading model in accordance with the invention. FIG. 3 includes only the basic functions associated with the invention. It is understood that other functions, processing steps and the like may be required to implement a commercial system in accordance with the invention. A user initiates or posts a contract. The Exchange preferably withholds or causes the custodial bank to withhold the expected payoff and the contract becomes "live." The Exchange preferably assigns a trade ID number for the live contract. The custodial bank holds user funds until the contract expires or until the user cancels the live contract. Preferably, the Exchange will not accept a contract if the user's account does not contain sufficient funds.

The Exchange searches its database and finds an exact match for the contract. If there is an exact match, the contract becomes "active". From that time, neither party can unilaterally cancel the contract. If a user wants to respond to a "live" contract, the user enters the contract's ID number, which was assigned by the Exchange when the initial user placed the contract on the system. The Exchange or the custodial bank withholds the expected payoffs, activates the contract and sends confirmations to both parties. Similarly, the system will not accept the order if the user does not have enough funds in the account. If a user wants to negotiate with the initiator of a "live" contract, the respondent must place an order to counteroffer the existing contract. The Exchange assigns a contract ID number for the counteroffer. If the user agrees to the counteroffer, the counteroffer's ID number is used to create an activate contract. When placing orders, users can use standard trading preferences, such as "good-'till-cancel", "fill-or-kill", "all-or-nothing" and "no-counter-offer".

Structuring a Contract

An Exchange contract is an agreement that two investors enter into upon defining a specific investment opportunity. Each contract has four elements: target price, limit/range, time and payoff amount. The value of the contract is the expected payoff that two investors determine when they structure the contract. Investors do not hold the underlying commodities or agree to execute the buying and selling of the underlying commodities at any time. Exchange contracts are structured by at least two individuals, neither of whom is employed by the Exchange.

Figure 4:
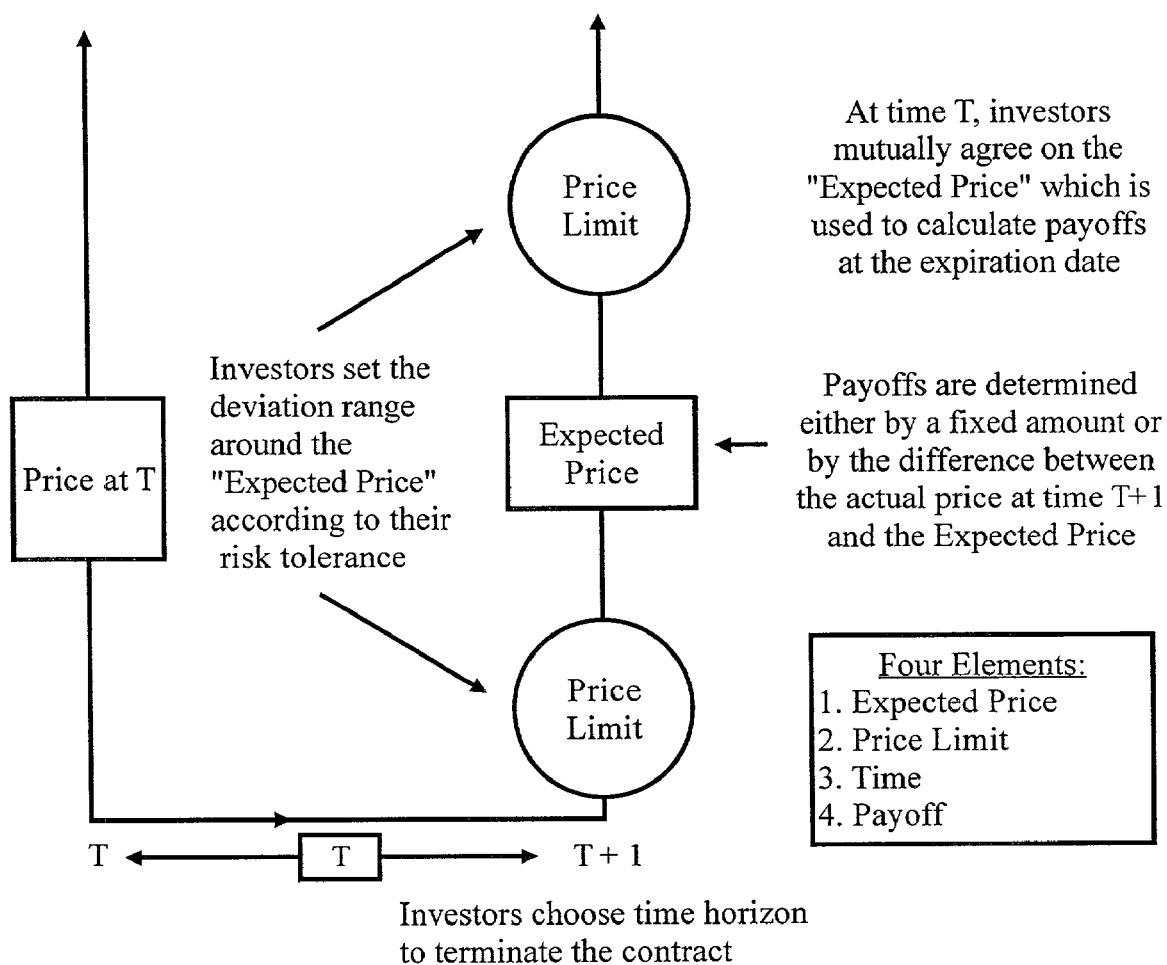
FIG. 4 graphically shows how investors set their investment preferences based on four elements, target price, price limit, time and payoff in accordance with the invention.

Referring to FIG. 4, Investors determine those four elements based on their investment preferences:

Target price—Investors agree on a target price that is used to calculate gains and losses when the contract expires or is terminated. The target price is determined based on the individuals' expectations of the price movement of an underlying commodity in the future.

For underlying commodities having an associated monetary value (such as a stock or bond) the target price is the expected monetary value of the underlying commodity at the time of payoff multiplied by an appropriate non-zero coefficient. Similarly, for underlying commodities having an associated non-monetary value (such as heating an/or cooling days) the target price is the non-monetary value of the underlying commodity at the time of payoff multiplied by an appropriate non-zero coefficient. Accordingly, the target price can be expressed by the following equation:

Target price=(Value of the Underlying Commodity)×(Coefficient)

The coefficient is selected by the parties to fix a target price that is a multiple, fraction or a numerical equivalent of the actual value of the underlying commodity at the time of payoff. It is understood that the coefficient can have a value of 1 (i.e., Target price=Value of the Underlying Commodity) or any other non-zero value.

Deviations from Target price or Range—Individuals set price deviations from the target price to specify the range of the target price movement of a commodity. Investors can choose to have no price limit, or investors can cap expected discrete deviations of price or define a price range in fixed-time contracts. Investors define a "price band" or "price range" that is determined by each individual's level of risk tolerance. Investors set the price band in conjunction with time horizon to defined payoffs. Price deviations, the price range and the price band in a contract need not be symmetric between two investors.

Time Horizon—Contracts can be structured as either fixed- or "flexible-time." Fixed-time contracts do not terminate until the expiration date, when payoffs will be made. In contrast, flexible-time contracts can terminate prior to the expiration date if the actual price of the relevant commodity reaches a pre-determined price or price band before the expiration date of the contract. Payoffs on flexible time contracts are made when the actual market price reaches the limit of the pre-determined price band or the expiration date is reached, whichever comes first.

Payoff Systems—Individuals choose between two available payoff systems to decide the maximum gains and losses on a contract. Investors can have a fixed lump-sum payoff system to define the maximum payoff (gains or losses) regardless of the magnitude of the commodity's price change. The amount of the payoff is determined when the contract is entered and will be made at the contract's expiration. Alternatively, investors can choose the Dollars-per-Tick payoff system. Investors mutually agree on the dollar amount payoff for each tick change above or below the target price. The total payoff is calculated as the product of the Dollars-per-Tick and the number of ticks that the actual market price deviates from the target price when the contract is terminated. Payoffs, either as a lump-sum or as a Dollars-per-Tick, need not be symmetric between the contracting parties.

Exemplary Alternative Contracts

Figure 5:
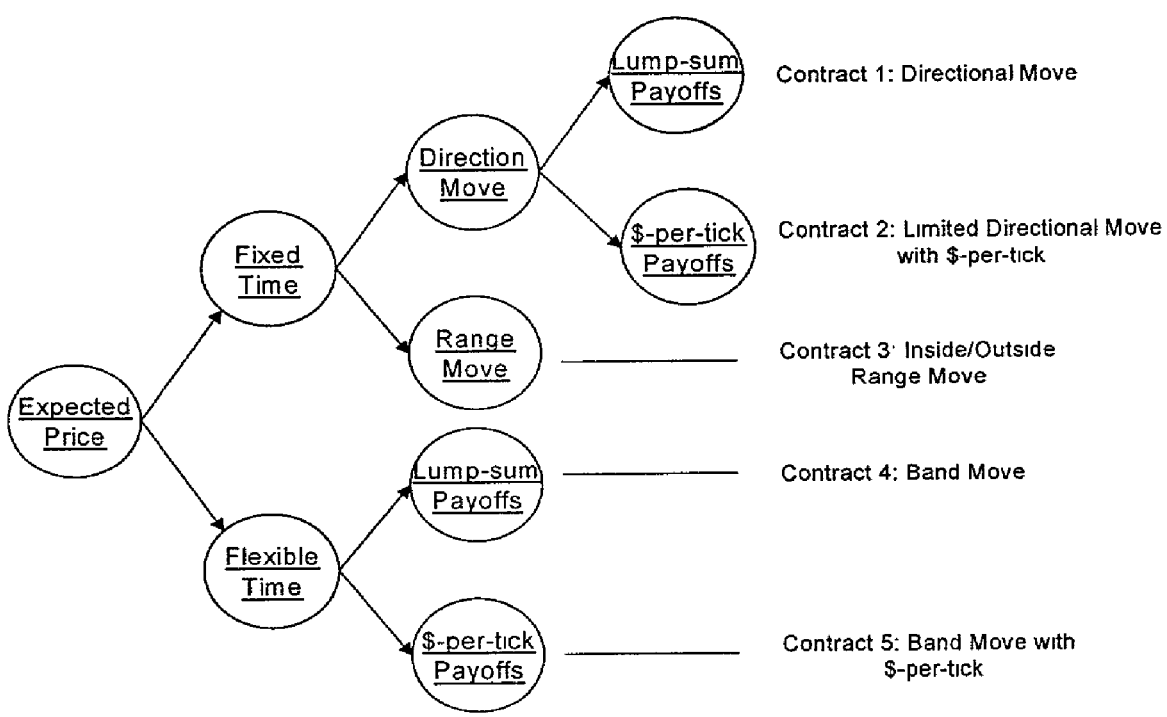
FIG. 5 graphically shows the relationship between alternative contracts in accordance with the invention.

The invention encompasses at least a set of five alternative contracts for investors to capture the potential return from the price movement of a commodity without holding the underlying commodity. FIG. 5 shows the relationship between alternative contracts in accordance with the invention.

Exemplary Contract 1: Directional Move—Investors negotiate a target price for a commodity (i.e., a price predicted by investors), an expiration date and a fixed lump-sum payoff. The underlying commodity has a terminal value (e.g., realized market price) at the expiration time of the investment contract. The difference between the target price and the terminal value thereby defines a price movement having a direction. The direction of the commodity's price movement determined at the contract's expiration time then is used to determine the recipient of the fixed lump-sum payoff. Prior to contract activation, each investor preferably deposits the lump-sum payoff into his or her account maintained at a designated custodial bank. The custodial bank freezes or holds the maximum potential payoff of both investors from the inception of the contract until the contract expires. Preferably, investors cannot unilaterally terminate an active Directional Move contract before the expiration time. At the expiration date, the custodial bank transfers or causes the transfer of the lump-sum payoff to the appropriate account. The lump-sum payoff is fixed and does not depend on the magnitude of the movement of the commodity's actual price relative to the target price at the expiration time.

Figure 6:
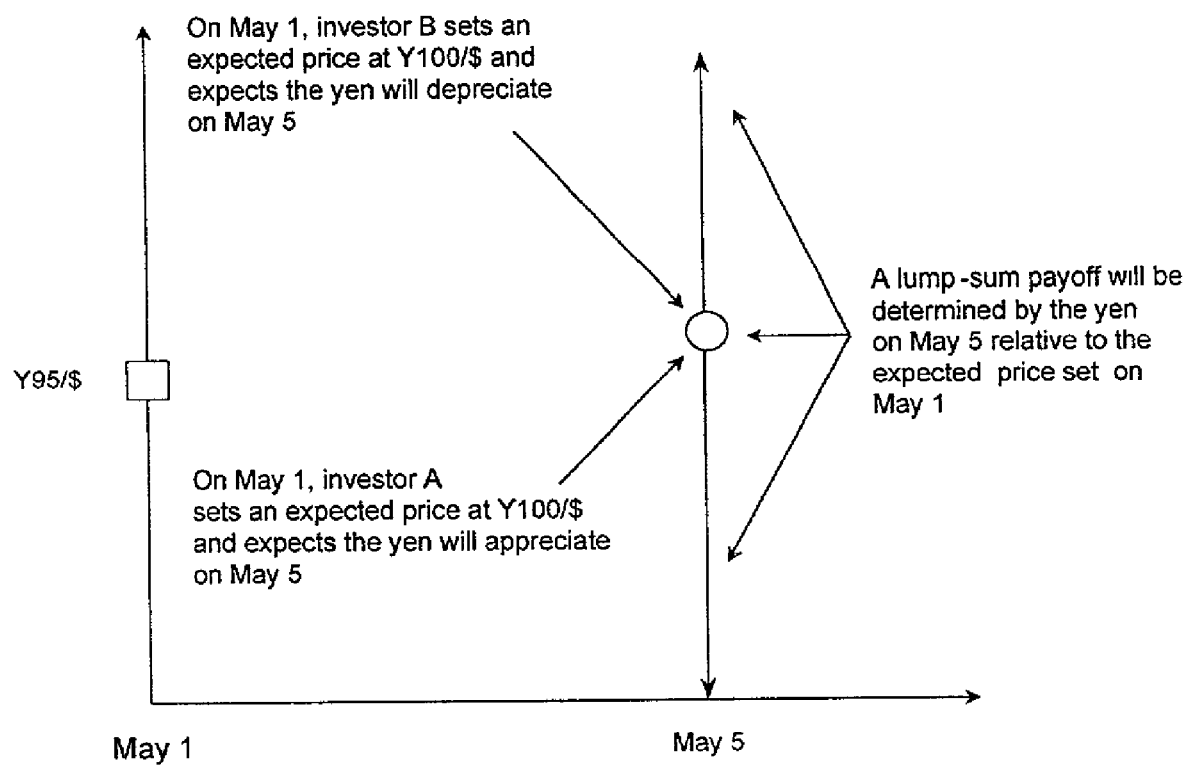
FIG. 6 shows two investors that have entered into a Directional Move contract in accordance with the invention.

As shown in FIG. 6, Investors A and B have entered into a Directional Move contract. In this example it is assumed that the Japanese yen is at Y95 per US dollar on May 1. Investors A and B mutually set a target price at Y100/$ and a lump-sum payoff of $1,000. Investor A expects the yen to appreciate above Y100/$ and Investor B expects the yen to depreciate below Y100/$ on May 5 (the expiration date). Investor A receives $1,000 from B if the yen has appreciated above Y100/$ on May 5 (the expiration date). Otherwise, Investor B receives $1,000 from A. Note that A and B can set the target price at any level and can specify a payoff amount of their choosing, including asymmetric payoffs.

Prior to activation of the contract, $1,000 from each investor's account is transferred to a custodial account. On the expiration date, the Exchange transfers or causes the transfer of $2,000 ($1,000 deposit and $1,000 contract payoff) to the account of Investor A if the yen is stronger than Y100/$. If the yen is weaker than Y100 on May 5, $2,000 is transferred to Investor B. If the yen is at Y100/$ on May 5, the price movement and direction are effectively 0, and neither party receives a payoff on the contract. In this case, each investor's $1,000 deposit is returned to his or her account. Table 1 below summarizes the payoffs under different scenarios.

TABLE 1

|  |  | May 5 | | |
| --- | --- | --- | --- | --- |
| Yen | May 1 | Scenario 1 | Scenario 2 | Scenario 3 |
| Market Price | Y95/$ | >Y100/$ | =Y100/$ | <Y100/$ |
| Investor A | Target price: Y100/$ | Loss: $1,000 | 0 | Gain: $1,000 |
| Investor B | Target price: Y100/$ | Gain: $1,000 | 0 | Loss: $1,000 |

Exemplary Contract 2: Limited Directional Move with Dollars-per-Tick—The investors negotiate a target price for a commodity, an expiration date and Dollars-per-Tick. The difference between the target price and the market value of the underlying commodity upon expiration of the contract thereby defines a price movement or band having a number of ticks and a direction. Upon expiration of the contract, the direction of the commodity's price movement determines the recipient of the lump-sum payoff and the number of ticks from the target price are then used to calculate the value of the lump-sum payoff.

Preferably, a cap or a limit on the commodity's price movement from the target price and a pre-selected Dollar-per-Tick value are used to limit the maximum payoff at the contract's expiration date. Preferably, the custodial bank freezes the maximum potential payoff (i.e., the number of ticks between the band's limit and the target price multiplied by the dollars per tick) in both investors' accounts. Preferably, the investors cannot unilaterally terminate the contract before expiration. Upon expiration, the Exchange calculates the payoffs and transfers or causes the custodial bank to transfer the payoff to the appropriate account. The total payoff at expiration depends on the number of ticks that the underlying commodity price at expiration deviates from the target price. However, if the underlying commodity price has moved outside of the band, the total payoff is capped at the band's outer limit.

Figure 7:
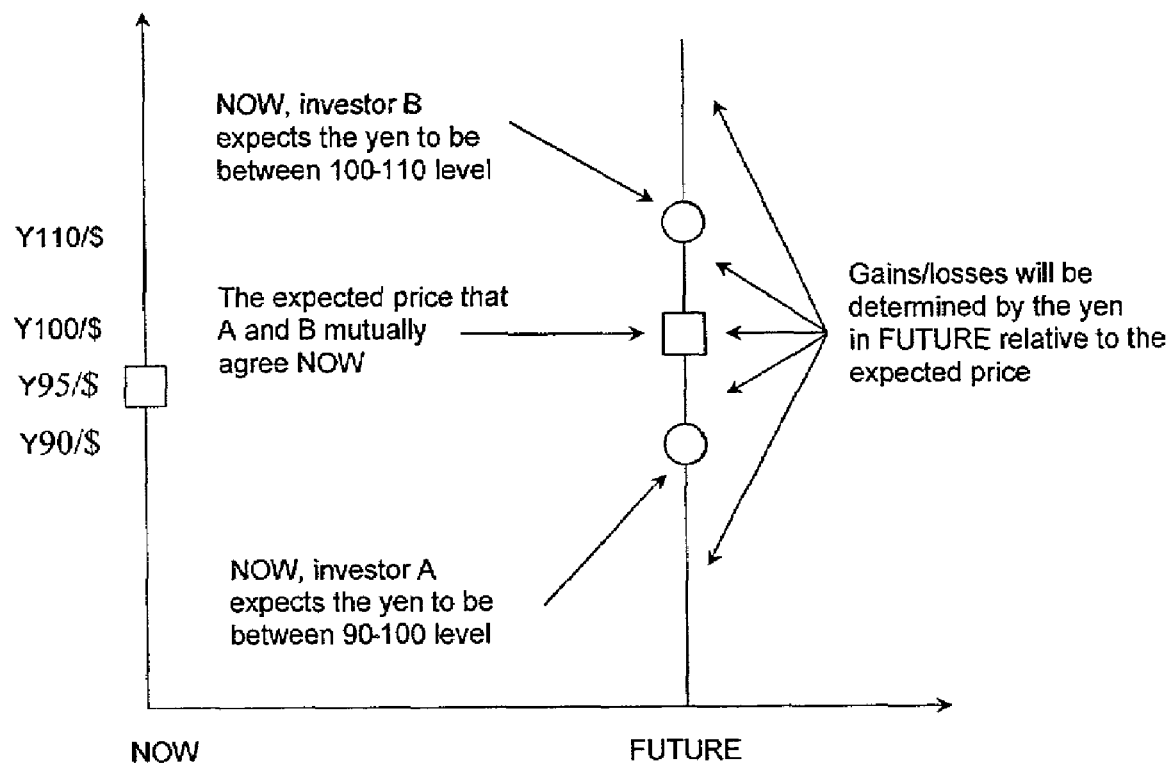
FIG. 7 shows two investors that have entered into a Limited Directional Move with Dollars-per-Tick contract in accordance with the invention.

As shown in FIG. 7, Investors A and B have entered into a Limited Directional Move with Dollars-per-Tick contract. In this example, it is assumed that the Japanese yen is at Y95 per US dollar on May 1. Investor A expects the yen to appreciate and Investor B expects the yen to depreciate by May 5. Investors A and B mutually agree on Y100/$ as the target price and a Dollars-per-Tick of $100 for every tick of deviation from the target price. In addition, both investors set a Y10/$ limit from the target price to cap the maximum payoff at $1,000 ($100 per yen×10 yen). Investors A and B can negotiate any value of Dollars-per-Tick and/or cap. The Dollars-per-Tick values (and hence the payoffs) and/or caps can also be different for Investors A and B in the same contract and need not be symmetric.

On May 1, the custodial bank freezes $1,000 in the accounts of Investors A and B, the maximum potential loss for each party. If investors reduce the Dollars-per-Tick from $100 to $10, they reduce the potential loss and, therefore, the required deposit to $100 ($10 per yen×10 yen). Alternatively, if investors reduce the limit from Y 10/$ to Y1/$, they reduce their potential losses and therefore their deposits to $100 ($100 per yen×1 yen).

There are five scenarios for the yen on May 5: (i) at Y100/$, (ii) between Y100-110/$, (iii) above Y110/$, (iv) between Y90/$ and Y100/$, and (v) below Y90/$. If the yen is at or above Y110/$ on May 5 (Scenario 1), Investor B makes $1,000 ($100 per yen×10 yen). Although the yen depreciates to greater than Y110/$, the maximum gains for Investor B are capped at $1,000 as agreed upon by the investors on May 1. If the yen is in the range of Y100/$-Y110/$ on May 5 (Scenario 2), Investor B makes a profit equal to the difference between the market price and the target price multiplied by $100 per yen. If the yen appreciates to Y90/$ or more on May 5 (Scenario 5), Investor A makes $1,000. If the yen appreciates to between 90-100 (Scenario 4), Investor A makes a profit equivalent to the difference between market price and the target price multiplied by $100 per yen. If the yen is at Y100 on May 5 (Scenario 3), neither Investor makes or loses money. Table 2 below summarizes gains/losses in the five different scenarios.

TABLE 2

|  |  | May 5 | | | | |
| --- | --- | --- | --- | --- | --- | --- |
| Yen | May 1 | Scenario 1 | Scenario 2 | Scenario 3 | Scenario 4 | Scenario 5 |
| Market Price | Y95/$ | Equal or greater than Y110/$ | Between Y100/$ and Y110/$ | Y100/$ | Between Y90/$ and Y100/$ | Equal or lower than Y90/$ |
| Investor A | Target price: Y100/$ Limits: Y90/$ and Y110/$ | Loss: $1,000 ($100 per yen and investors capped at 10 yen | Loss: $100 multiplied by the number of yen between the price on May 5 and the target price | 0 | Gain: $100 multiplied by the number of yen between the price on May 5 and the target price | Gain: $1,000 ($100 per yen and investors capped at 10 yen) |
| Investor B | Target price: Y100/$ Limits: Y90/$ and Y110/$ | Gain: $1,000 ($100 per yen and investors capped at 10 yen) | Gain: $100 multiplied by the number of yen between the price on May 5 and the target price | 0 | Loss: $100 multiplied by the number of yen between the price on May 5 and the target price | Loss: $1,000 ($100 per yen and investors capped at 10 yen) |

Exemplary Contract 3: Inside and Outside Range Move—Investors negotiate a target price range for a commodity at the contract's expiration date and a fixed lump-sum payoff. The custodial bank freezes the maximum potential payoff of both investors from the inception of the contract until the contract expires. Investors preferably cannot unilaterally terminate the contract before the expiration date. At the expiration date, the Exchange deposits or causes the custodial bank to deposit the lump-sum payoff to the account of the appropriate investor.

Figure 8:
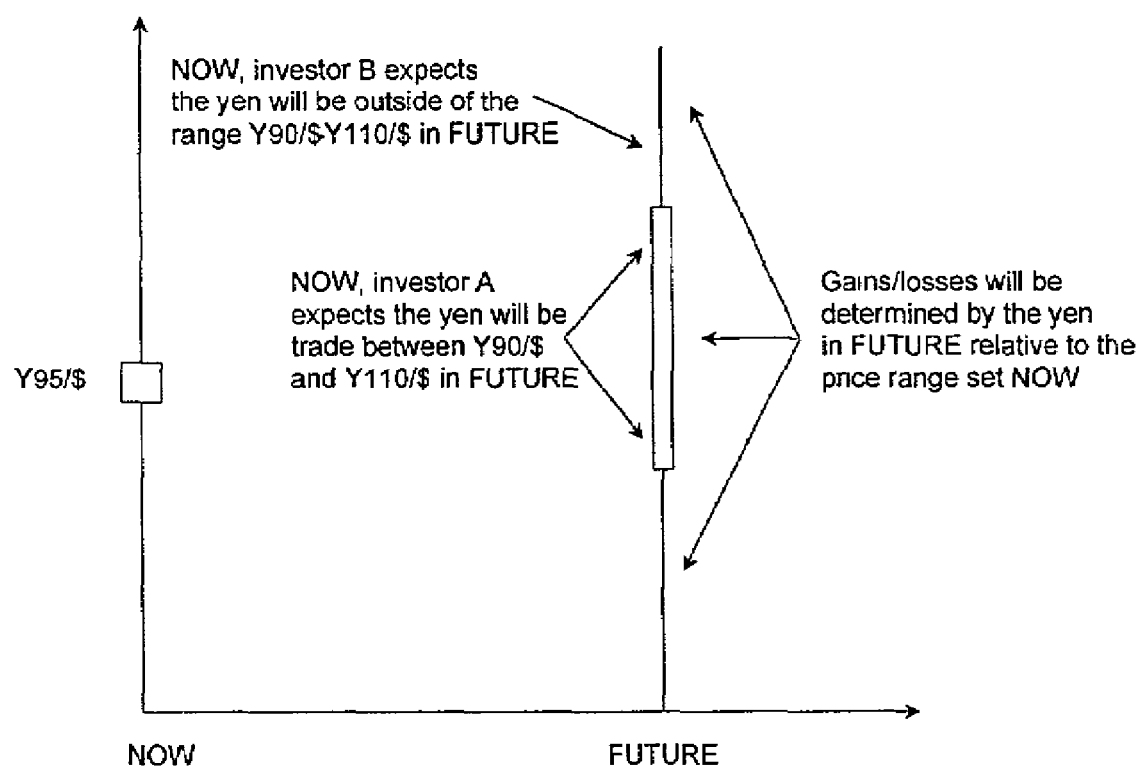
FIG. 8 shows two investors that have entered into a Inside and Outside Range Move contract in accordance with the invention.

As shown in FIG. 8, Investors A and B have entered into an Inside and Outside Range Move contract. In this example, it is assumed that the Japanese yen is at Y95 per US dollar on May 1. Investor A expects the yen to be in the range of Y90/$ to Y110/$ on May 5 (the expiration date). In contrast, Investor B expects the yen will be outside of this range on May 5 (the expiration date). Investor A agrees to pay $1,000 if the yen is out of the range Y90/$-Y 110/$ and to receive $ 1,000 if the yen is inside the range Y90/$-Y110/$ on May 5. Investors A and B can negotiate other ranges and payoffs. The ranges and payoffs need not be symmetric.

On May 1, the Exchange freezes or causes the custodial bank to freeze $1,000, the lump-sum payoff, of each investor. On May 5, the Exchange deposits $2,000 ($1,000 deposit and $1,000 contract payoff) or causes the custodial bank to deposit $2000 to the account of Investor A if the yen is traded between Y90/$-Y110/$ range. Otherwise, the $2,000 payoff is deposited in the account of Investor B. Table 3 below summarizes the payoffs under various scenarios.

TABLE 3

|  |  | May 5 | | |
| --- | --- | --- | --- | --- |
| Yen | May 1 | Scenario 1 | Scenario 2 | Scenario 3 |
| Market Price | Y95/$ | >Y110/$ | Between Y90/$-Y100/$ | <Y110/$ |
| Investor A | Inside Range: Y90/$-Y110/$ | Loss: $1,000 | Gain: $1,000 | Loss: $1,000 |
| Investor B | Outside Range: Y90/$-Y110/$ | Gain: $1,000 | Loss: $1,000 | Gain: $1,000 |

Exemplary Contract 4: Band Move—The investors negotiate a target price for a commodity, a price band of the commodity during the life of the contract and a fixed lump-sum payoff. The price band has an upper limit associated with one investor's expectation and a lower limit associated with the other investor's expectation.

Preferably the custodial bank freezes the fixed lump-sum payoff of both investors until the contract is terminated. The contract is terminated and the fixed lump-sum payoff is made if the underlying commodity's price hits the upper or lower limit before the contract's expiration time. If the commodity's actual price does not hit the upper or lower limit of the band during the life of the contract, the fixed lump-sum payoff is paid to the appropriate account at expiration, based upon whether the price of the commodity is above or below the target price.

Figure 9:
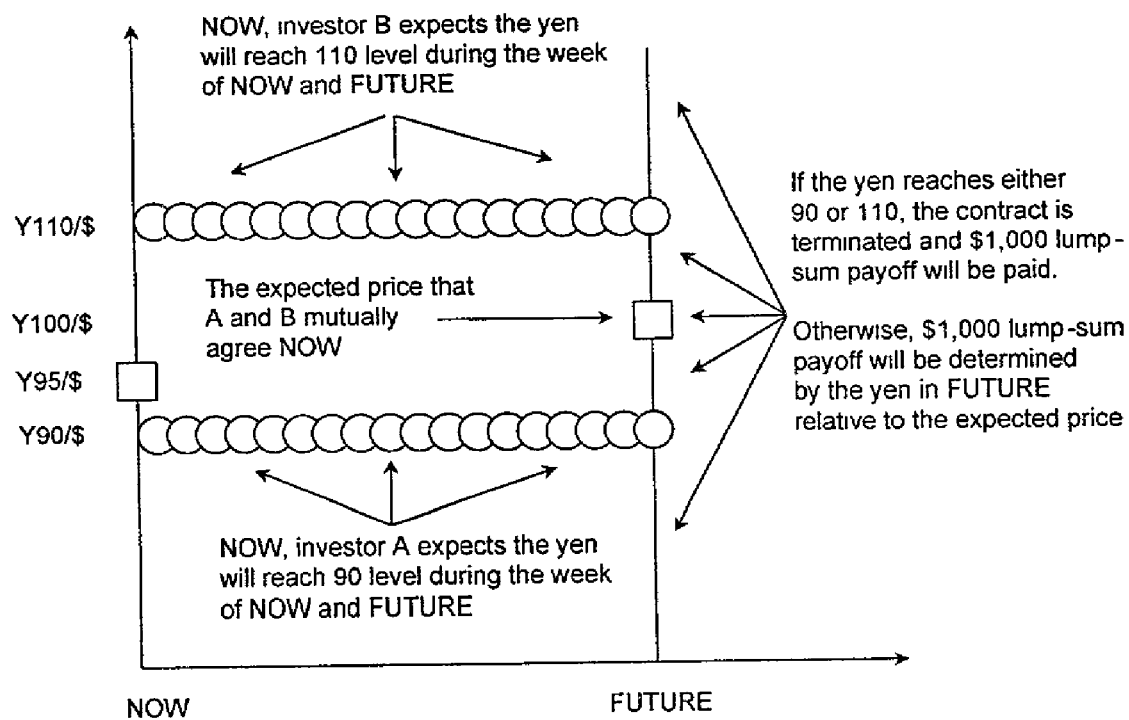
FIG. 9 shows two investors that have entered into a Band Move contract in accordance with the invention.

As shown in FIG. 9, Investors A and B have entered into a Band Move contract. In this example, it is assumed that the Japanese yen is at Y95/$ on May 1. Investor A expects the yen to appreciate and to reach Y90/$ during May 1-5 (the lower limit or first terminal value). Investor B expects the yen to depreciate and to reach Y110/$ during May 1-5 (the upper limit or second terminal value). Investors A and B agree on the target price of Y100/$. A lump-sum payoff of $1,000 will be made if the yen reaches either Y90/$ or Y110/$ during the week.

On May 1, the custodial bank freezes $1,000 in each client account. The Exchange deposits or causes the custodial bank to deposit $2,000 ($1,000 deposit and $1,000 contract payoff) to the account of Investor A if the yen reaches Y90/$ during the week. Similarly, the Exchange deposits or causes the custodial bank to deposit $2,000 to the account of Investor B if the yen reaches Y110/$ during the week. If the yen does not reach Y90/$ or Y110/$ during May 1-5, the lump-sum payoff is made on May 5 based on the market price relative to the target price. If the yen appreciates to less than Y100/$, the $2,000 payoff is deposited to the account of Investor A. If the yen depreciates to greater than Y100/$, the $2,000 payoff is deposited to the account of Investor B. Table 4 below summarizes the payoffs under different scenarios.

TABLE 4

|  |  | May 1-5 | | May 5 | | |
| --- | --- | --- | --- | --- | --- | --- |
| Yen | May 1 | Scenario 1 | Scenario 2 | Scenario 1 | Scenario 2 | Scenario 3 |
| Market Price | Y95/$ | >=Y110/$ | <=Y90/$ | >Y100/$ | =Y100/$ | <Y100/$ |
| Investor A | Target price: Y100/$ Limit: Y90/$ | Loss: $1,000 | Gain: $1,000 | Loss: $1,000 | 0 | Gain: $1,000 |
| Investor B | Target price: Y100/$ Limit: Y90/$ | Gain: $1,000 | Loss: $1,000 | Gain: $1,000 | 0 | Loss: $1,000 |

Exemplary Contract 5: Band Move with Dollars-per-Tick—The investors negotiate a target price for a commodity and a target price band for the commodity during the life of the contract. The target price band has an upper limit associated with one investor's expectation and a lower limit associated with the other investor's expectation. Payoffs are determined based on the amount of Dollars-per-Tick and the number of ticks of deviation from the target price. Preferably, the custodial bank freezes the maximum potential payoff (i.e., the number of ticks between the band's upper or lower limit and the target price multiplied by the dollars per tick) of both investors until the contract expires. If the underlying commodity's market value hits the band's upper or lower cap during the life of the contract, the contract is terminated and the maximum payoff is transferred to the appropriate investor. If not, payoffs are calculated and distributed to the appropriate accounts on the pre-selected expiration date.

In this example, Investors A and B have entered into a Band Move with Dollars-per-Tick contract. It is again assumed that the Japanese yen is at Y95/$ on May 1. Investor A expects the yen to appreciate and to reach Y90/$ between May 1-5. Investor B expects the yen to depreciate and to reach Y110/$ between May 1-5. Investors A and B agree on a target price of Y100/$. In addition, both investors agree to terminate the contract and a payoff is made if the yen reaches either Y90/$ or Y110/$ during the week. If not, the contract is terminated and the payoff is determined on May 5 as discussed above in connection with FIG. 9. However, in this contract Investors A and B agree on a payoff of $100 for each yen deviation from the target price.

On the first day of the contract, the custodial bank freezes $1,000 ($100 per yen×10 yen) of both Investors A and B. Note that if the Investors reduce the Dollars-per-Tick from $100 to $10, they reduce their potential losses and, therefore, their deposits to $100 ($10 per yen×10 yen). Alternatively, if the Investors reduce the limit from Y10/$ to Y1/$, they reduce their potential losses and therefore their deposits to $100 ($100 per yen×1 yen).

During the week of May 1-5, the Exchange deposits $2,000 ($1,000 payoff deposit and $1,000 in profits) to the account of Investor A if the yen reaches Y90/$. If the yen falls to Y110/$, the Exchange deposits $2,000 to the account of Investor B. If the yen does not reach Y90/$ or Y110/$ during the week, on May 5 the Exchange calculates a payoff per tick relative to the target price.

If the yen depreciates to greater than Y100/$ by May 5, Investor A receives a payoff that equal to the product of $100 per yen and the difference between the target price and the actual price. In contrast, if the yen depreciates to above Y100/$ on May 5, Investor B receives a payoff equal to the product of $100 per yen and the difference between the target price and the actual price. Table 5 below summarizes the payoffs under different scenarios.

TABLE 5

| Yen | May 1 | May 1-5 | | May 5 | | |
| --- | --- | --- | --- | --- | --- | --- |
| | | Scenario 1 | Scenario 2 | Scenario 1 | Scenario 2 | Scenario 3 |
| Market Price | Y95/$ | >= Y110/$ | <=Y90/$ | >Y100/$ and, <Y110/$ | =Y100 | <Y100 and >Y90/$ |
| Investor A | Target price: Y100 Limit: Y90 | Loss: $1,000 | Gain: $1,000 | Loss: $100 per yen deviation from expected | 0 | Gain: $100 per yen deviation from expected |
| Investor B | Target price: Y100 Limit: Y90 | Gain: $1,000 | Loss: $1,000 | Gain: $100 per yen deviation from expected | 0 | Loss: $100 per yen deviation from expected |

While this invention has been described with an emphasis upon preferred embodiments, it will be obvious to those of ordinary skill in the art that variations in the preferred devices and methods may be used and that it is intended that the invention may be practiced otherwise than as specifically described herein.

What is claimed is:

1. A computerized method of administering an investment contract between pairs of investors, comprising:

associating a contract with a first investor, wherein the contract is based on at least one underlying commodity having a market value, said market value being obtained electronically from a computing system of a dataprovider, wherein the first investor does not hold the underlying commodity or agree to buy or sell the underlying commodity and wherein the first investor deposits funds in an account in an amount equal to a maximum potential loss to the first investor;

matching by an exchange computer system the contract with a second investor to create an active contract, wherein the second investor does not hold the underlying commodity or agree to buy or sell the underlying commodity, and wherein the second investor deposits funds in an account in an amount equal to a maximum potential loss to the second investor;

at least temporarily freezing the first investor funds and the second investor funds associated with the contract;

determining whether one of the first and second investor is to receive a payment based on the market value of the underlying commodity upon expiration of the contract in relation to one of a target price and a target price range; and paying the frozen first and second investor funds to one of the first and second investor upon expiration of the contract if either the first or second investor is to receive a payment, otherwise, returning to each investor his deposited funds, wherein expiration of the contract is based on at least one of a deviation from a target price range and a specified maturity date.

2. The method of claim 1,
wherein a price movement has a direction defined by comparing the target price to the market value of the underlying commodity upon expiration of the contract,
wherein the contract specifies an expiration date, a first and second expected direction associated with the first and second investor and a fixed lump-sum payment, the specified expiration date, first and second expected directions and fixed lump-sum payment being set by the first and second investors, and
wherein the payment is selectively transferred to one of the first and second investor upon expiration of the contract based on the direction of the price movement of the commodity in relation to the first and second expected direction.

3. The method of claim 1,
wherein a price movement has a number of ticks and direction defined by comparing the target price to the market value of the underlying commodity upon expiration of the contract, wherein the contract specifies an expiration time, a first expected direction and first dollars per tick associated with the first investor, and second expected direction and second dollars per tick associated with the second investor, the specified expiration time, first and second expected directions, and the first and second dollars per tick being set by the first and second investors, and
wherein the payment is calculated and transferred to one of the first and second investor upon expiration of the contract based on the direction of the price movement, the number of ticks and the first and second dollars per tick.

4. The method of claim 3,
wherein the contract further specifies a cap, and
wherein the payment transferred to one of the first and second investor is limited by the cap.

5. The method of claim 1,
wherein the commodity has a market value at expiration of the contract, and
wherein the contract specifies an expiration date, a first target price range associated with the first investor, a second target price range associated with the second investor and a fixed lump-sum payment, the specified expiration date, first target price range, second target price range, and fixed lump-sum payment being set by the first and second investors, and
wherein the fixed lump-sum payment is transferred to one of the first and second investor upon expiration of the contract based on the market value of the commodity upon expiration of the contract in relation to the first and second price ranges.

6. The method of claim 5, wherein the fixed lump-sum payment is transferred to the first investor if the market value of the commodity upon expiration of the contract falls within the first target price range.

7. The method of claim 5, wherein the fixed lump-sum payment is transferred to the second investor if the market value of the commodity upon expiration of the contract falls within the second target price range.

8. The method of claim 1,
wherein the commodity has a market value upon expiration of the contract,
wherein the contract specifies an expiration date, a price range bounded by an upper cap associated with the first investor and a lower cap associated with the second investor and fixed lump-sum payment, the expiration date, bounded price range, and fixed lump-sum payment being set by the first and second investors, and
wherein the fixed lump-sum payment is transferred to one of the first and second investor based on one of the market value of the commodity upon expiration of the contract in relation to the price range.

9. The method of claim 8, wherein the fixed lump-sum payment is transferred to the first investor if the market value of the commodity reaches the upper cap prior to the expiration date.

10. The method of claim 8, wherein the fixed lump-sum payment is transferred to the second investor if the market value of the commodity reaches the lower cap prior to the expiration date.

11. The method of claim 8, wherein the fixed lump-sum payment is transferred to the first investor on the expiration date if the market value of the commodity on the expiration date falls within a portion of the price range associated with the first investor.

12. The method of claim 8, wherein the fixed lump-sum payment is transferred to the second investor on the expiration date if the market value of the commodity on the expiration date falls within a portion of the price range associated with the second investor.

13. The method of claim 1,
wherein the commodity has a market value at expiration of the contract, and
wherein he contract specifies an expiration date, a price range bounded by an upper cap associated with the first investor and a lower cap associated with the second investor, a target price and dollars-per-tick, the expiration date, the bounded price range, target price, and dollars-per-tick being set by the first and second investors, and
wherein a payment is calculated and transferred to one of the first and second investor upon expiration of the contract based on the market value of the commodity upon expiration of the contract in relation to the price range.

14. The method of claim 13, wherein the payment transferred to one of the first and second investor is limited by one of the first and second cap.

15. The method of claim 14, wherein the payment is transferred to the first investor if the market value of the commodity reaches the first cap prior to the expiration date.

16. The method of claim 14, wherein the payment is transferred to the second investor if the market value of the commodity reaches the second cap prior to the expiration date.

17. The method of claim 13, wherein the payment is transferred to the first investor on the expiration date if the market value of the commodity on the expiration date falls within a price range associated with the first investor.

18. The method of claim 17, wherein the payment is calculated based on the difference between the market value of the commodity upon expiration of the contract and the target price multiplied by the dollars-per-tick.

19. The method of claim 13, wherein the payment is transferred to the second investor on the expiration date if the market value of the commodity on the expiration date falls within a price range associates with the second investor.

20. The method of claim 19, wherein the payment is calculated based on the difference between the market value of the commodity upon expiration of the contract and the target price multiplied by the dollars-per-tick.

21. A system for creating an electronic exchange for trading in and administering investment contracts between pairs of investors, comprising: an exchange computer system that performs the steps of:
(i) associating a contract with a first investor, wherein the contract is based on at least one underlying commodity having a market value, said market value being obtained from a computing system of a dataprovider, wherein the first investor does not hold the underlying commodity or agree to buy or sell the underlying commodity, and wherein the first investor deposits funds in an account in an amount equal to a maximum potential loss to the first investor;

(ii) matching the contract with a second investor thereby creating an active contract, wherein the second investor does not hold the underlying commodity or agree to buy or sell the underlying commodity, and wherein the second investor deposits funds in an account in an amount equal to a maximum potential loss to the second investor;

(iii) at least temporarily freezing the first investor funds and the second investor funds associated with the contract;

(iv) determining whether one of the first and second investor is to receive a payment based on the market value of the underlying commodity upon expiration of the contract in relation to one of a target price and a target price range; and (v) paying the frozen first and second investor funds, to one of the first and second investor upon expiration of the contract if either the first or second investor is to receive a payment, otherwise, returning to each investor his deposited funds, wherein expiration of the contract is based on at least one of a deviation from a target price range and a time horizon.

22. The system of claim 21,
wherein a price movement has a direction defined by comparing the target price-to-the market value of the underlying commodity upon expiration of the contract, wherein the contract specifies an expiration date, a first and second expected direction associated with the first and second investor and a fixed lump-sum payment, the specified expiration date, first and second expected directions and fixed lump-sum payment being set by the first and second investors, and
wherein the payment is selectively transferred to one of the first and second investor upon expiration of the contract based on the direction of the price movement of the commodity in relation to the first and second expected direction.

23. The system of claim 21,
wherein a price movement has a number of ticks and direction defined by comparing the target price to the market value of the underlying commodity upon expiration of the contract,
wherein the contract specifies an expiration time, a first and second expected direction associated with the first and second investor and dollars per tick, the specified expiration time, first and second expected directions, and the dollars per tick being set by the first and second investors, and
wherein the payment is calculated and transferred to one of the first and second investor upon expiration of the contract based on the direction of the price movement, the number of ticks and the dollars per tick.

24. The system of claim 23, wherein the contract further specifies a cap, and wherein the payment transferred to one if the first and second investor is limited by the cap.

25. The system of claim 21,
wherein the commodity has a market value at expiration of the contract, and
wherein the contract specifies an expiration date, a first target price range associated with the first investor, a second target price range associated with the second investor and a fixed lump-sum payment, the specified expiration date, first target price range, second target price range, and fixed lump-sum payment being set by the first and second investors, and
wherein the fixed lump-sum payment is transferred to one of the first and second investor upon expiration of the contract based on the market value of the commodity upon expiration of the contract in relation to the first and second price ranges.

26. The system of claim 25, wherein the fixed lump-sum payment is transferred to the first investor if the market value of the commodity upon expiration of the contract falls within the first target price range.

27. The system of claim 25, wherein the fixed lump-sum payment is transferred to the second investor if the market value of the commodity upon expiration of the contract falls within the second target price range.

28. The system of claim 21,
wherein the commodity has a market value upon expiration of the contract,
wherein the contract specifies an expiration date, a price range bounded by an upper cap associated with the first investor and a lower cap associated with the second investor and -fixed lump-sum payment, the expiration date, bounded price range, and fixed lump-sum payment being set by the first and second investors, and
wherein the fixed lump-sum payment is transferred to one of the first and second investor based on one of the market value of the commodity upon expiration of the contract in relation to the price range.

29. The system of claim 28, wherein the fixed lump-sum payment is transferred to the first investor if the market value of the commodity reaches the upper cap prior to the expiration date.

30. The system of claim 28, wherein the fixed lump-sum payment is transferred to the second investor if the market value of the commodity reaches the lower cap prior to the expiration date.

31. The system of claim 28, wherein the fixed lump-sum payment is transferred to the first investor on the expiration date if the market value of the commodity on the expiration date falls within a portion of the price range associated with the first investor.

32. The system of claim 28, wherein the fixed lump-sum payment is transferred to the second investor on the expiration date if the market value of the commodity on the expiration date falls within a portion of the price range associated with the second investor.

33. The system of claim 21,
wherein the commodity has a market value at expiration of the contract, and
wherein the contract specifies an expiration date, a price range bounded by an upper cap associated with the first investor and a lower cap associated with the second investor, a target price and dollars-per-tick, the expiration date, the bounded price range, target price, and dollars-per-tick being set by the first and second investors, and
wherein a payment is calculated and transferred to one of the first and second investor upon expiration of the contract based on the market value of the commodity upon expiration of the contract in relation to the price range.

34. The system of claim 33, wherein the payment transferred to one of the first and second investor is limited by one of the first and second cap.

35. The system of claim 34, wherein the payment is transferred to the first investor if the market value of the commodity reaches the first cap prior to the expiration date.

36. The system of claim 34, wherein the payment is transferred to the second investor if the market value of the commodity reaches the second cap prior to the expiration date.

37. The system of claim 33, wherein the payment is transferred to the first investor on the expiration date if the market value of the commodity on the expiration date falls within a price range associated with the first investor.

38. The system of claim 37, wherein the payment is calculated based on the difference between the market value of the commodity upon expiration of the contract and the target price multiplied by the dollars-per-tick.

39. The system of claim 33, wherein the payment is transferred to the second investor on the expiration date if the market value of the commodity on the expiration date falls within a price range associated with the second investor.

40. The system of claim 39, wherein the payment is calculated based on the difference between the market value of the commodity upon expiration of the contract and the target price multiplied by the dollars-per-tick.

\* \* \* \* \*